July 15, 1952 D. FRIEND 2,603,379
PRESSURE RELIEF RADIATOR CAP
Filed March 17, 1948
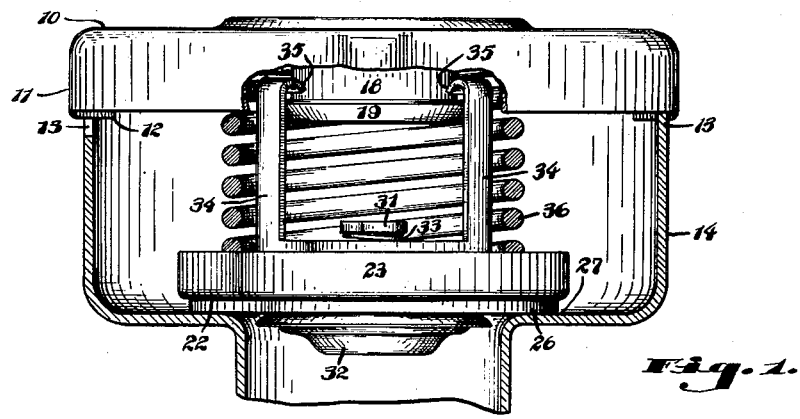
INVENTOR.
DAWSON FRIEND,
BY:
Harold B. Obed.
ATTORNEY.

Patented July 15, 1952

2,603,379

UNITED STATES PATENT OFFICE 2,603,379

PRESSURE RELIEF RADIATOR CAP

Dawson Friend, Connersville, Ind., assignor to Stant Manufacturing Company, Connersville, Ind., a corporation of Indiana Application March 17, 1948, Serial No. 15,421

3 Claims. (Cl. 220—44)

The present invention relates to a valved cap for an automobile radiator, or the like; and the primary object of the invention is to provide a device of the character under consideration which shall be improved in various respects over devices intended for the same purpose and known to the art heretofore. Thus, one object of the invention is to provide improved means for removably attaching a valve assembly to a cap assembly. Another object of the invention is to provide a cap structure of such character that it may be used with or without an associated valve assembly; and to relate the structure of a valve assembly to that cap assembly in such fashion as to permit ready connection or disconnection between the cap assembly and the valve assembly. A further object of the invention is to provide a valve assembly with spaced finger means resiliently engageable with depending support means incorporated in a cap assembly. A further object of the invention is so to construct the co-operating parts of the valve assembly and the cap assembly that, as the two assemblies are advanced toward each other in coaxial relation, the cooperable parts thereof will be cammed automatically into connecting relation. A further object of the invention is to provide connecting means of the character indicated so arranged that they may be caged within a coiled spring entrapped between the cap assembly and the valve assembly. Another object of the invention is to provide an improved valve assembly including a pressure relief valve having an annular gasket for cooperation with a filler neck mouth, and a vacuum relief valve resiliently cooperating with the same gasket.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is an elevational view of my improved valved closure cap shown in closing relation with a filler neck for an automobile radiator, or the like, parts being broken away for clarity of illustration;

Fig. 2 is a transverse section through the improved valved cap; and

Fig. 3 is a horizontal section taken substantially on the line 3, 3 of Fig. 2.

Referring more particularly to the drawings, it will be seen that I have illustrated a metal cap 10 having a depending annular flange 11 with which are associated tabs 12 for cooperation with the standard camming lugs 13 of a filler neck 14 of standard construction. The cap is provided, in the illustrated embodiment of my invention, with a central depression or socket 15 in which is housed one head of a rivet 16 which secures to the inner surface of said cap an element 17 having a perimetral annular depending portion 18 which terminates in an upturned, outwardly flaring annular lip 19. The terminus of said lip, as it clearly shown in Figs. 1 and 2, is substantially axially spaced from the facing inner surface of the cap 10.

In accordance with standard practice, I prefer to provide a gasket 20 surrounding the depression 15 and bearing against the inner surface of the cap, and a washer 21 bearing against said gasket.

A metal valve member 22 is preferably provided with an upturned annular lip 23 and with a central aperture 24. A hollow rivet 25 secures a gasket 26 to the lower surface of said valve member 22, said gasket being adapted to engage a seat 27 at the mouth of the filler neck 14 to seal the same. The same rivet 25 secures to the upper surface of the valve 22 an annular unit 28 to be described in detail hereinafter.

Freely mounted in the opening 29 through the rivet 25 is a valve stem 30 provided at its upper end with a head 31, and carrying at its lower end a second valve 32 which is pressed into cooperative engagement with the gasket 26 by a coiled spring 33 bearing against the unit 28 and against the stem head 31. Thus, the spring 33 holds the valve 32 resiliently in cooperation with the gasket 26 to prevent fluid flow through the opening 29 in the rivet 25.

The unit 28 comprises a plurality of resilient fingers 34 symmetrically arranged about the central axis of the valve member 22 and projecting upwardly away from said valve to a level substantially above the uppermost limit of movement of the stem 30. In the illustrated embodiment of my invention, I have shown two such fingers 34, diametrically spaced from each other; but it will be readily apparent that any desired greater number of fingers may be used if desired. At its upper end, each finger 34 is formed to provide an inwardly turned hook 35 which, in the preferred embodiment of the invention, inclines radially inwardly and toward the valve member 22. The radial distance from the axis of the valve member 22 to the tip of each finger hook 35, when said fingers are in positions of equilibrium, is somewhat less than the radial distance from said axis to the terminus of the lip 19. As a consequence, when the hooks 35 have been engaged with the lip 19, the tips of said hooks are located radially inwardly with respect to the terminus of the lip 19 to prevent axial disengagement, thereby holding the valve assembly against axial separation from the cap assembly. In the preferred embodiment of the invention, the lip 19 is flared and the finger hooks 35 are inclined at such angles that, as the valve assembly and the cap assembly are advanced toward each other, while in coaxial relation, the upper surfaces of the finger hooks will coact with the lower surface of the lip 19 in a camming action to flex the resilient fingers 34 outwardly to permit the tips of the finger hooks to pass the terminus of the lip 19, whereafter the fingers 34 will snap back to positions of equilibrium in which the hooks cannot be separated from the lip.

This condition is illustrated in Figs. 1 and 2, from a consideration of which it will be apparent that the mutually facing surfaces of the fingers 34 will now cooperate with the lip 19 to limit transaxial relative movement between the cap assembly and the valve assembly.

A coiled spring 36 is preferably entrapped between the cap assembly and the valve assembly, said spring bearing at one end upon the valve member 22 and at its opposite end upon the washer 21. It will be clear that the structure is such as to permit ready relative rotation between the cap assembly and the valve assembly, and that a substantial degree of relative rocking movement between the two assemblies is also permitted. The spring 36 preferably surrounds the fingers 34 and lip 19, thereby acting as a cage for the means connecting the two assemblies. While disconnection of the valve assembly from the cap assembly is easy for one who knows the construction of the device, by insertion of a tool between the volutions of the spring 36 to flex one or the other of the fingers 34 outwardly, the caging of the connecting means tends to obscure the construction of such means sufficiently so that unauthorized separation of the two assemblies is inhibited.

I claim as my invention:

1. In a device of the class described, a cap, an element fixed to the inner surface of said cap centrally thereof and having an annularly depending portion terminating in an upturned lip whose terminus is spaced from said cap surface, a rigid valve member having a central opening therein, an annular gasket fixed to the lower surface of said valve member, a unit fixed to the upper surface of said valve member and having an opening therein registering with said opening in said valve member, a second valve having a stem freely penetrating the openings in said valve member, gasket, and unit, said second valve being cooperable with said gasket to close said openings, spring means bearing on said unit and said stem and resiliently holding said second valve in cooperative engagement with said gasket, said unit including a plurality of resilient fingers symmetrically arranged about the axis of said openings and projecting away from said valve member beyond the uppermost position of said stem, each finger terminating in an axially-inwardly-directed hook turned toward said valve member, the radial distance from said axis to the tip of each hook being less than the radial dimension of said lip when said fingers are in positions of equilibrium, said hooks being engageable with said lip and disengageable therefrom by flexure of said fingers to secure said valve member removably to said cap.

2. The device of claim 1 including a coiled spring compressed between said cap and said valve member and urging axial separation thereof.

3. The device of claim 2 in which said coiled spring surrounds said fingers to form a cage therefor.

DAWSON FRIEND.

REFERENCES CITED

The following references are of record in the file of this patent:

UNITED STATES PATENTS

| Number | Name | Date |
|---|---|---|
| 1,554,644 | Moore | Sept. 22, 1925 |
| 1,766,173 | Hills | June 24, 1930 |
| 2,068,626 | Clifford | Jan. 19, 1937 |
| 2,164,450 | Eshbaugh et al. | July 4, 1939 |
| 2,181,969 | Eshbaugh | Dec. 5, 1939 |
| 2,266,314 | Eshbaugh | Dec. 16, 1941 |
| 2,406,502 | Lines | Aug. 27, 1946 |